(12) United States Patent
Siekas et al.

(10) Patent No.: US 6,681,902 B1
(45) Date of Patent: Jan. 27, 2004

(54) BRAKE SHOE MOUNTING SYSTEM FOR A VEHICLE BRAKE ASSEMBLY

(75) Inventors: Don Siekas, Melvindale, MI (US); Anthony Schmandt, Walled Lake, MI (US); Paul June, Garden City, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/162,509

(22) Filed: Jun. 4, 2002

(51) Int. Cl.$^7$ ............................................... F16D 63/00
(52) U.S. Cl. ................................. 188/70 R; 108/250 B; 108/325; 108/328; 108/331
(58) Field of Search ................................ 188/70 R, 250 F, 188/250 D, 250 B, 325, 327, 328, 341, 331, 335

(56) References Cited

U.S. PATENT DOCUMENTS

| | | | |
|---|---|---|---|
| 2,658,473 A | | 11/1953 | Hunt |
| 4,184,574 A | | 1/1980 | England |
| 4,217,973 A | * | 8/1980 | Johns et al. ............. 188/79.54 |
| 5,070,968 A | * | 12/1991 | Evans ...................... 188/79.64 |
| 5,322,145 A | * | 6/1994 | Evans ....................... 188/70 R |
| 5,343,987 A | * | 9/1994 | Varzescu ................. 188/79.63 |
| 6,003,645 A | * | 12/1999 | Asai et al. .................. 188/328 |
| 6,345,708 B1 | * | 2/2002 | Fujiwara ..................... 188/341 |

FOREIGN PATENT DOCUMENTS

| | | |
|---|---|---|
| DE | 197 49 574 | 5/1999 |
| JP | 52 135969 | 11/1977 |
| JP | 57 103942 | 6/1982 |

* cited by examiner

Primary Examiner—Jack Lavinder
Assistant Examiner—Mariano Sy
(74) Attorney, Agent, or Firm—McMillan, Sobanski & Todd, LLC

(57) ABSTRACT

This invention relates to a brake shoe mounting system for a vehicle brake assembly. The vehicle brake assembly brake shoe mounting system includes a brake mounting member and a pair of brake shoes slidably supported relative to the brake mounting member. The brake member is adapted to be secured to a fixed, non-rotatable component of the vehicle and includes an abutment having a pair of opposed slots formed therein. Each brake shoe includes a first end, an opposite second end, a web portion, a rim portion secured to an outer surface of the web portion, a friction pad secured to an outer surface of the rim portion, and only two shoe slides provided on at least one side of the rim portion. One of the two shoe slides is provided near the first end of the brake shoe and the other of the two shoe slides is provided generally intermediate the first and second ends of the brake shoe. In accordance with this invention, the second end of the brake shoe defines a shoe abutment end. The shoe abutment end is disposed in the slot of the abutment and in contact with an associated surface of the slot of the abutment to thereby define a third shoe slide of the brake shoe.

26 Claims, 8 Drawing Sheets

BRAKE SHOE MOUNTING SYSTEM FOR A VEHICLE BRAKE ASSEMBLY

BACKGROUND OF THE INVENTION

This invention relates in general to vehicle drum brake assemblies and drum-in-hat disc brake assemblies and in particular to a brake shoe mounting system for use in such a vehicle drum brake assembly and drum-in-hat disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. In some instances, the disc brake assembly can be a "drum-in-hat" type of disc brake assembly. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical drum-in-hat type of disc brake assembly includes a hydraulically or pneumatically actuated disc service brake and a mechanically actuated drum-in-hat parking and emergency brake. The disc service brake includes a rotor which is secured to the wheel of the vehicle for rotation therewith. The rotor includes a pair of opposed friction plates which are selectively engaged by portions of a caliper assembly. The interior of the rotor defines a cylindrical braking surface.

A caliper assembly is slidably supported by pins secured to a mounting flange. The mounting flange is secured to a non-rotatable component of the vehicle, such as the steering knuckle or the axle flange. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The drum-in-hat parking and emergency brake includes a pair of opposed arcuate brake shoes which are supported on a backing plate for selective movement relative thereto. The backing plate is secured to the mounting flange, or alternatively, can be formed integral therewith. Each of the brake shoes has a friction pad or lining secured thereto. The brake shoes extend within the cylindrical braking surface of the rotor. To effect parking and emergency braking action, the operator of the vehicle manually pulls an actuating lever. The lever is connected to an actuation cable having a park brake cable end which, when pulled, actuates a mechanical actuating mechanism. The actuating mechanism is located adjacent one of the ends of the brake shoes and is operative to move the brake shoes outwardly apart from one another such that the friction pads frictionally engage the cylindrical braking surface of the rotor. Such frictional engagement causes slowing or stopping of the rotational movement of the rotor and, therefore, the wheel of the vehicle in a controlled manner.

A typical drum brake assembly includes a backing plate which is secured to a fixed, non-rotatable component of the vehicle, such as the vehicle axle housing. A pair of opposed arcuate brake shoes are supported on the backing plate for selective movement relative thereto. Each of the brake shoes has a friction pad secured thereto. The brake drum assembly further includes a cylindrical brake drum which is secured to the vehicle wheel for rotation therewith. The interior of the brake drum is hollow, defining an inner cylindrical braking surface. The brake drum is disposed adjacent to the backing plate such that the brake shoes extend within the inner cylindrical braking surface. To effect braking action, the brake shoes are moved outwardly apart from one another such that the friction pads frictionally engage the inner cylindrical braking surface of the brake drum. Such frictional engagement causes slowing or stopping of the rotational movement of the brake drum and, therefore, the wheel of the vehicle in a controlled manner.

One or more actuating mechanisms are provided in the brake drum assembly for selectively moving the brake shoes outwardly apart from one another into frictional engagement with the cylindrical braking surface of the brake drum. Usually, a hydraulically or pneumatically actuated service brake mechanism is provided for selectively actuating the drum brake assembly under normal operating conditions. Such a service brake mechanism can include a hydraulic cylinder having a pair of opposed pistons which abut and move the brake shoes apart from one another into frictional engagement with the cylindrical braking surface of the brake drum.

A mechanically actuated parking and emergency brake mechanism is also usually provided for selectively actuating the drum brake assembly. The parking and service brake mechanism can include an actuating lever pivotally supported on one of the brake shoes. The actuating lever is connected to a cable which, when pulled, moves the brake shoes apart from one another into frictional engagement with the cylindrical braking surface of the brake drum.

SUMMARY OF THE INVENTION

This invention relates to a brake shoe mounting system for a vehicle brake assembly. The vehicle brake assembly brake shoe mounting system includes a an brake mounting member and a pair of brake shoes slidably supported relative to the brake mounting member. The brake member is adapted to be secured to a fixed, non-rotatable component of the vehicle and includes an abutment having a pair of opposed slots formed therein. Each brake shoe includes a first end, an opposite second end, a web portion, a rim portion secured to an outer surface of the web portion, a friction pad secured to an outer surface of the rim portion, and only two shoe slides provided on at least one side of the rim portion. One of the two shoe slides is provided near the first end of the brake shoe and the other of the two shoe slides is provided generally intermediate the first and second ends of the brake shoe. In accordance with this invention, the second end of the brake shoe defines a shoe abutment end. The shoe abutment end is disposed in the slot of the abutment and in contact with an associated surface of the slot of the abutment to thereby define a third shoe slide of the brake shoe.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
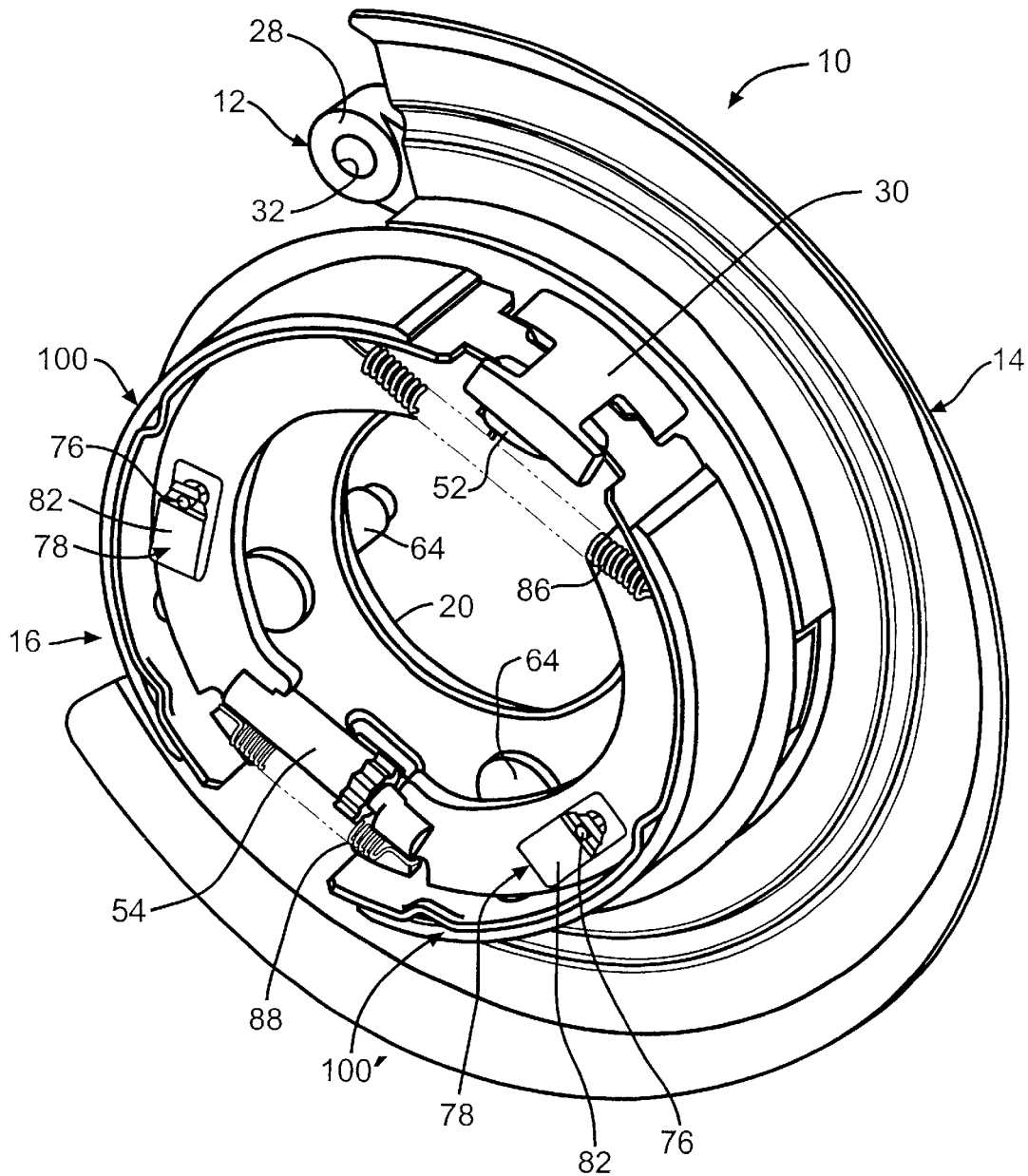
FIG. 1 is a perspective view of a portion of a vehicle drum-in-hat disc brake assembly constructed in accordance with the present invention.
Figure 2:
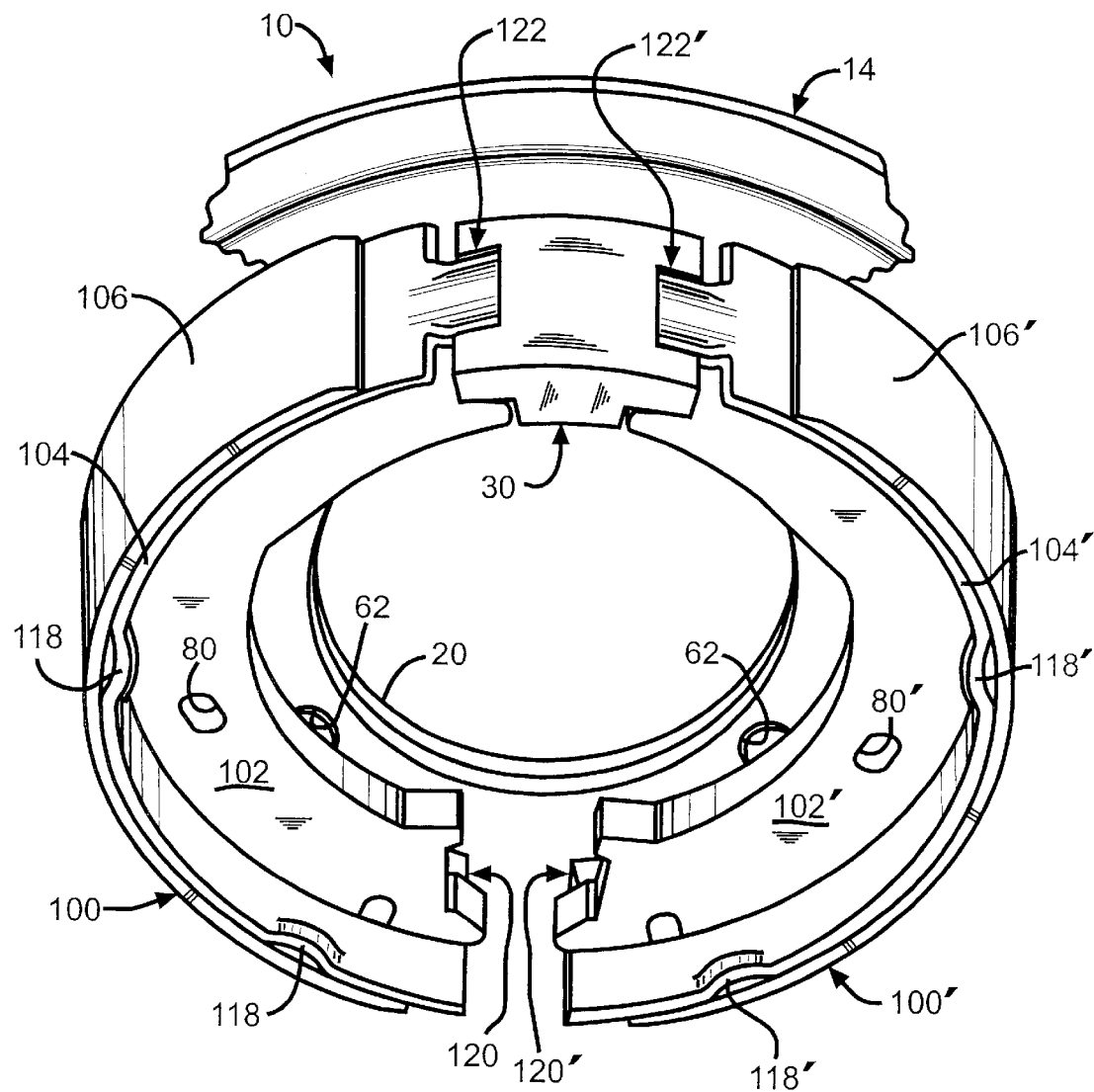
FIG. 2 is another view of some of the parts of the vehicle drum-in-hat disc brake assembly illustrated in FIG. 1.
Figure 3:
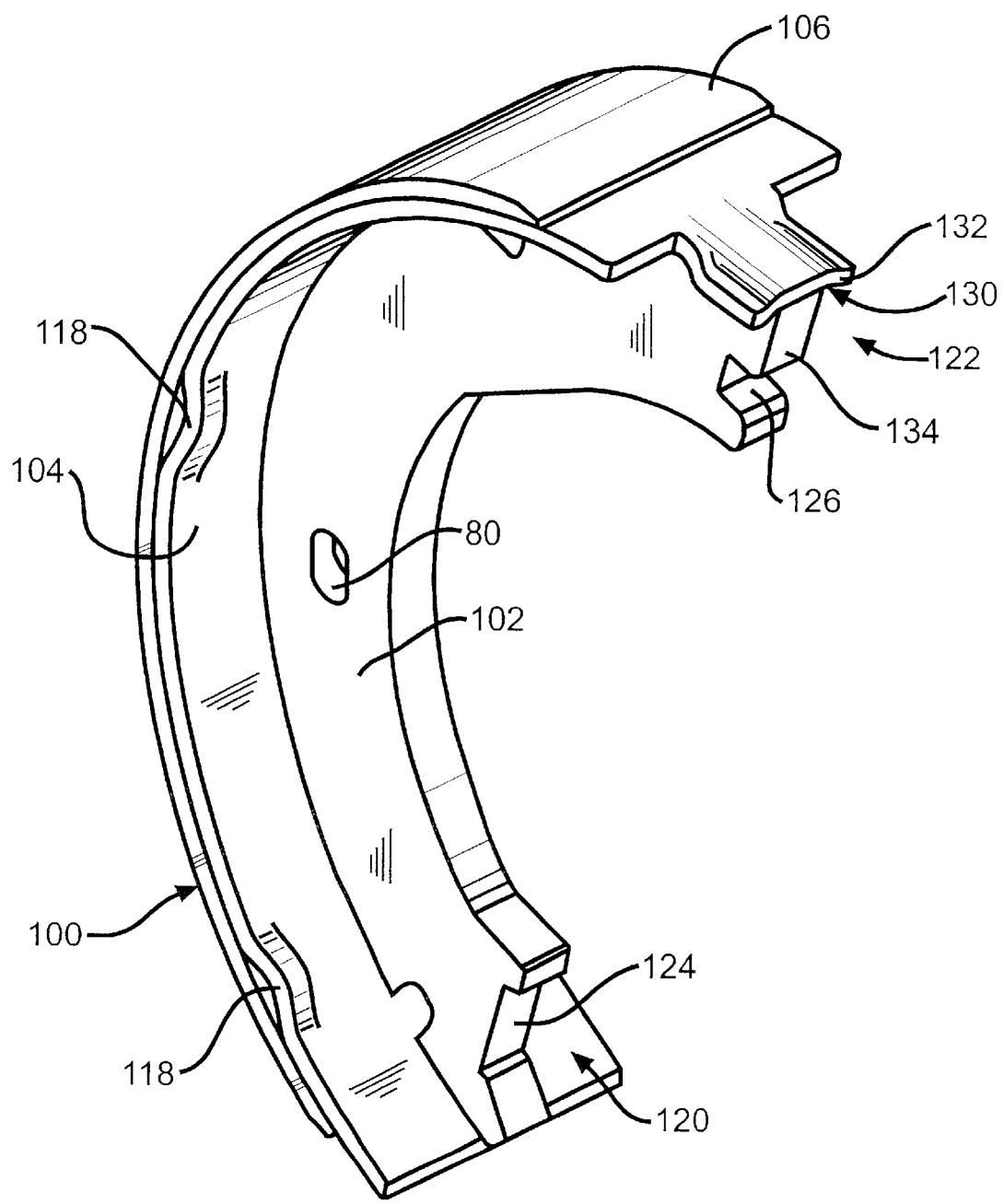
FIG. 3 is a perspective view of the brake shoe illustrated in FIGS. 1 and 2.
Figure 4:
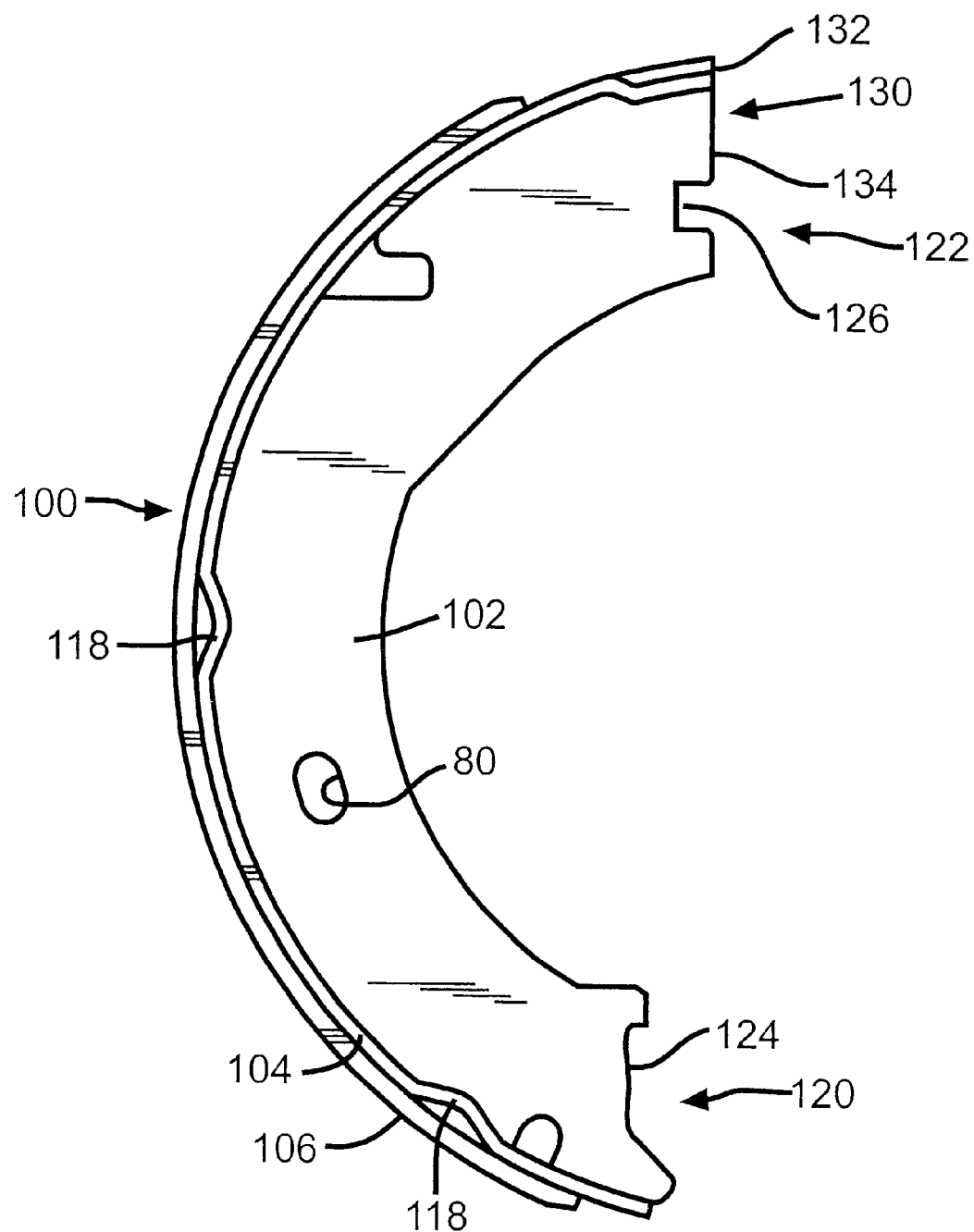
FIG. 4 is a side view of the brake shoe illustrated in FIGS. 1–3.

Referring now to the drawings, there is illustrated in FIGS. 1 and 2 a portion of a drum-in-hat disc assembly, indicated generally at 10, including a brake shoe mounting system in accordance with the present invention. The drum-in-hat disc brake assembly 10 includes a hydraulically or pneumatically actuated disc service brake (not shown), and a drum-in-hat parking and emergency brake. In the illustrated embodiment, the drum-in-hat parking and emergency brake is a sliding shoe type of brake. The general structure and operation of the drum-in-hat disc brake assembly is conventional in the art. Thus, only those portions of the drum-in-hat disc brake assembly which are necessary for a full understanding of this invention will be explained and illustrated in detail. Although this invention will be described and illustrated in connection with the particular vehicle drum-in-hat disc brake assembly 10 disclosed herein, it will be appreciated that this invention may be used in connection with other sliding shoe type drum-in-hat disc brake assemblies in connection with the associated parking and emergency brake portion, and with other sliding shoe type drum brake assemblies in connection with the associated service brake portion if so desired.

Figure 5:
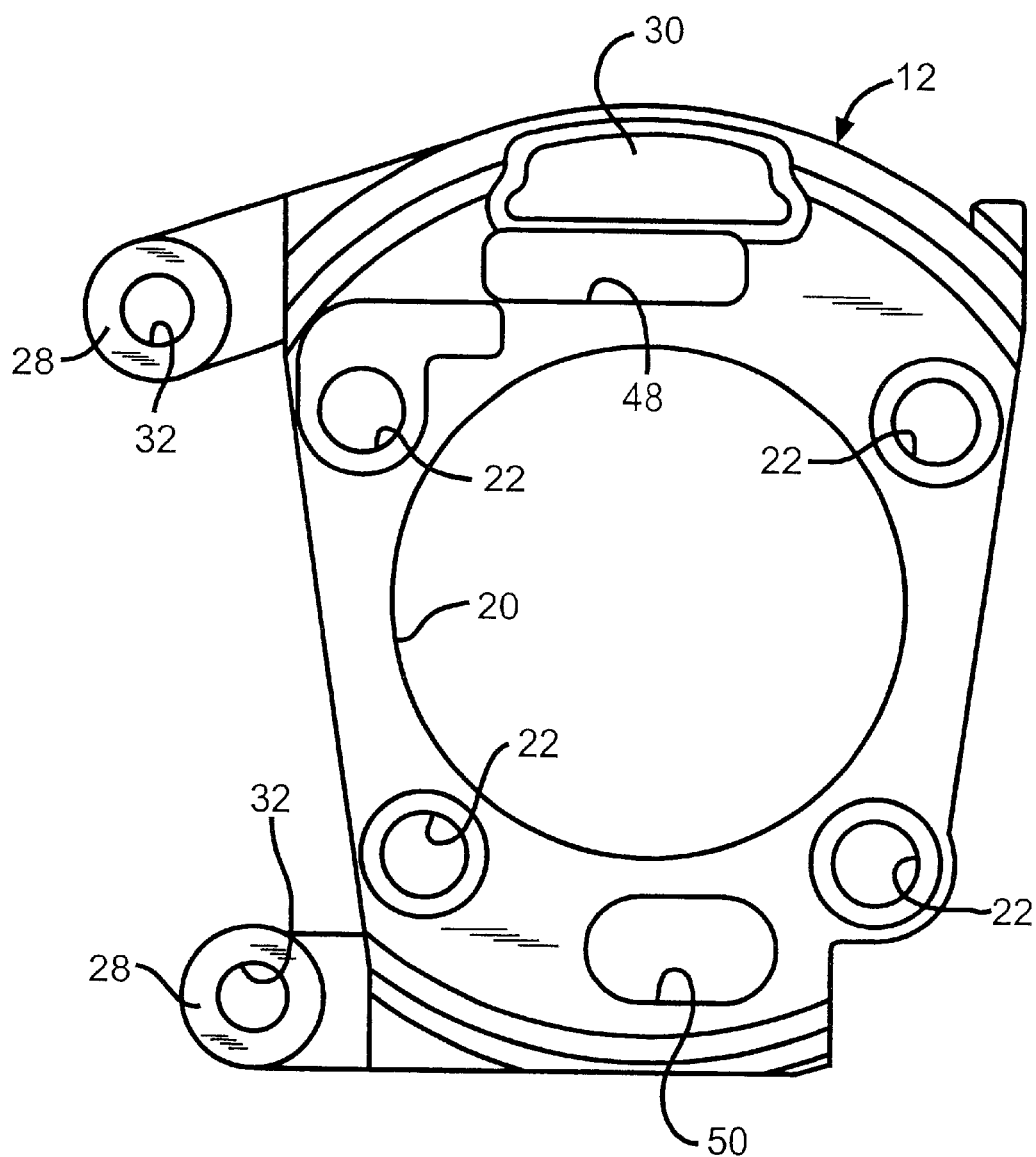
FIG. 5 is a plan view of the drum-in-hat adapter illustrated in FIGS. 1 and 2.
Figure 6:
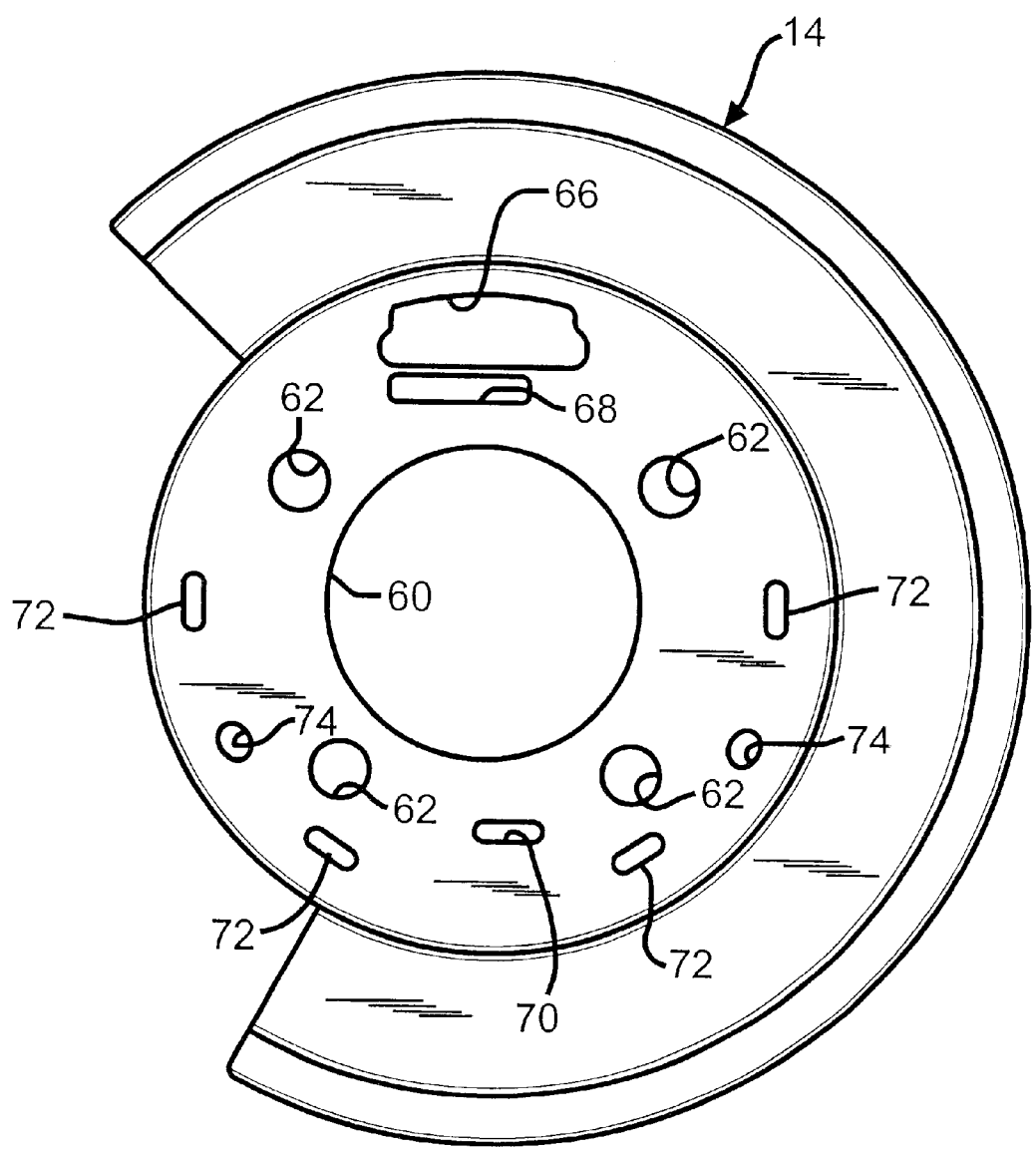
FIG. 6 is a plan view of the dust shield illustrated in FIGS. 1 and 2.

As shown in FIG. 1, the drum-in-hat disc brake assembly 10 includes a drum-in-hat adapter 12, a backing plate 14, and a drum-in-hat parking and emergency brake portion, indicated generally at 16. The drum-in-hat adapter 12 is illustrated as being a one-piece casting and is adapted to be secured to a fixed, non-rotatable component of the vehicle, such as an axle flange (not shown) or a steering knuckle (not shown) for enclosing a rotatable axle (not shown). To accomplish this, the adapter 12 (best shown in FIG. 5), includes a relatively large opening 20, and a plurality of holes 22 formed therein about the opening 20, the illustrated adapter having four of such holes 22. The opening 20 permits an outer end of an axle to extend therethrough to the vehicle wheel (not shown), and suitable fasteners 64 are disposed in the holes 22 to secure the adapter 12 to the associated vehicle component.

The adapter 12 further includes a pair of outwardly extending ears or lugs 28 and an abutment 30. The ears 28 are provided with holes 32 formed therein. A pair of suitable fasteners (not shown) are disposed in the holes 32 of the ears 28 to attach a disc brake caliper assembly (not shown) to the adapter 12. Alternatively, other structures than the one-piece drum-in-hat adapter 12 illustrated and described herein can be used. For example, a caliper supporting anchor plate, a mounting flange, and a backing plate such as shown in U.S. Pat. No. 5,322,145 to Evans can be used.

Figure 7:
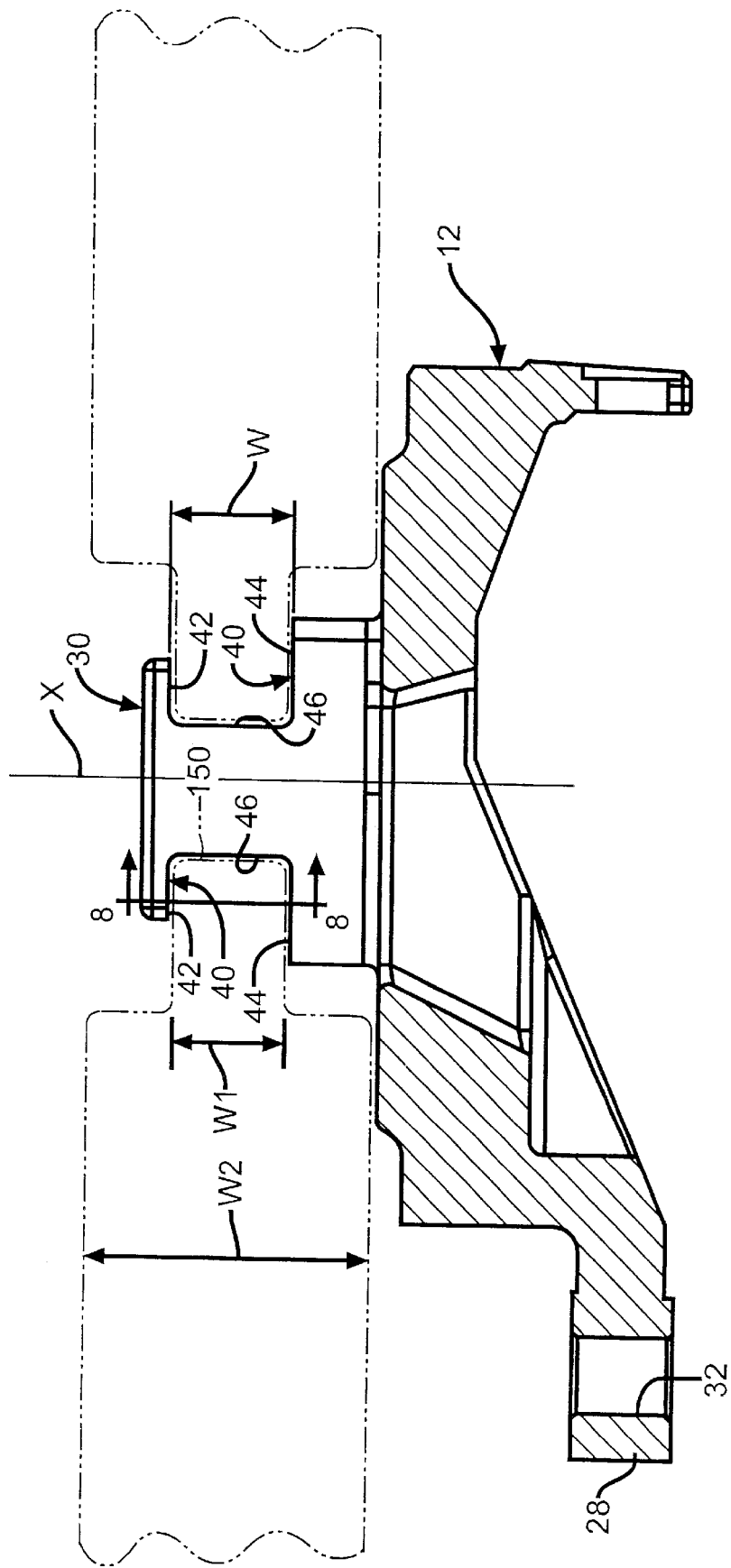
FIG. 7 is a partial sectional view of a portion of the vehicle drum-in-hat disc brake assembly illustrated in FIGS. 1 and 2.

The illustrated abutment 30 is integrally cast with the drum-in-hat adapter 12 and includes a pair of opposed slots or recesses 40 formed therein. In the illustrated embodiment the slots 40 are identical to one another and are generally U-shaped. As shown in FIG. 7, each slot includes a pair of opposed side surfaces 42 and 44 and an end or bottom surface 46. The side surfaces 42 and 44 extend generally parallel with respect to an axis X defined by the adapter 12. The end surface 46 extends generally perpendicular to the side surfaces 42 and 44 and generally parallel to the axis X. The side surfaces 42 and 44 define a slot width W. Alternatively, the structure of the one or both of the slots 40 of the adapter 12 can be other than illustrated and described if so desired. For example, the slot 40 could be generally L-shaped and include only the side surface 44 and the bottom surface 46.

The drum-in-hat adapter 12 further includes a generally elongated slotted first opening 48 and a generally elongated slotted second opening 50. The slotted opening 48 is adapted to allow a lever 52 (only an end portion of the lever 52 shown in FIG. 1) of a parking brake and emergency brake actuation mechanism (not shown) to extend therethrough. The slotted opening 50 is adapted to allow a suitable tool (not shown) to extend therethrough to adjust a pad wear mechanism 54 of the parking and emergency brake portion 16 of the brake assembly 10.

The illustrated backing plate 14 of the drum-in-hat disc brake assembly 10 is preferably a stamped metal backing plate and includes a relatively large central opening 60 and a plurality of openings 62 formed therein about the central opening 20. In the illustrated embodiment, the backing plate 14 is provided with four of such openings 62. The central opening 60 permits an outer end of the rotatable axle (not shown) to extend therethrough to a wheel (not shown) of the vehicle. The openings 62 are adapted to receive suitable fasteners, such as threaded mounting studs 64 shown in FIG. 1. The studs 64 extend through the openings 62 and the corresponding openings 22 formed in the drum-in-hat adapter 12 and nuts (not shown) are installed thereon to secure the backing plate 14 and the drum-in-hat adapter 12, and therefore the drum-in-hat disc brake assembly 10, to the associated vehicle component.

In the illustrated embodiment, the backing plate 12 also includes a generally elongated, slotted first opening 66, a generally elongated, slotted second opening 68, and a generally elongated slotted third opening 70. The first slotted opening 66 is adapted to allow the abutment member 30 of the drum-in-hat adapter 12 to extend therethrough. The second slotted opening 68 is adapted to allow the lever 52 of the actuator mechanism of the parking and emergency brake to extend therethrough. The third slotted opening 70 is adapted to allow adjustment of the pad wear adjustment mechanism 54. The backing plate 12 further includes a plurality pad rests 72 and a plurality of openings 74. In accordance with the present invention, the backing plate 12 is provided four of such pad rests 72. Alternatively, the number, location and/or structure of one or more of the openings 60, 62, 66, 68, 70 and 74 and/or the pad rests 72 can be other than illustrated if so desired.

The openings 74 are adapted to receive pins 76 of conventional pivot pin and spring-clip assemblies, indicated generally at 78. The pins 76 are adapted to extend through the openings 74 of the backing plate 14 and through associated openings 80 and 80' provided in a pair of brake shoes 100 and 100', respectively. The pins 76 have outer ends which are adapted to be fastened or secured to clips 82 of the spring-clip assemblies 78 to secure the brake shoes 100 and 100' to the backing plate 14 in a conventional manner. The illustrated drum-in-hat brake assembly 10 also includes a pair of retraction springs 86 and 88. Alternatively, the structure of the backing plate 12 can be other than illustrated if so desired.

The drum-in-hat parking and emergency brake portion 16 of the brake assembly 10 includes the pair of brake shoes 100 and 100' supported on the backing plate 14. Structurally, the brake shoes 100 and 100' are essentially mirror images of one another, and like reference numbers are used to indicate similar parts. The brake shoes 100 and 100' include respective web portions 102 and 102' which are generally flat and crescent-shaped. Generally arcuate-shaped rim portions 104 and 104' are secured to the opposed outer curved surfaces of the web portions 102 and 102', such as by welding. A friction pad 106 is secured to the outer arcuate surface of the rim portion 104 of the brake shoe 100, while a friction pad 106' is secured to the outer arcuate surface of the rim portion 104' of the brake shoe 100'.

The brake shoe 100 is provided with two shoe slides or "gimps" 118 provided on each side of the rim portion 104. (only the two shoe slides 118 on an outwardly facing side of the rim portion 104 being illustrated in FIGS. 1–4) for a purpose to be discussed below. Similarly, the brake shoe 100' includes two shoe slides 118' provided on each side of the rim portion 104' (only the two shoe slides 118' on an outwardly facing side of the rim portion 104' being illustrated in FIGS. 1–4). The shoe slides 118 and 118' are conventional in the art and are typically formed by a stamping operation during the manufacture of the respective rim portions 104 and 104' of the brake shoes 100 and 100'.

In the illustrated embodiment, the brake shoe 100 includes a first end 120 and an opposite "necked down" or reduced width second end 122. The web portion 102 of the first end 120 of the brake shoe 100 includes a notch 124 formed therein. The notch 124 is adapted to receive an end portion of a part of the pad wear adjuster 54 in a conventional manner. The web portion 102 of the second end 122 of the brake shoe 100 includes a notch 126 formed therein. The notch 126 is adapted to receive a part of the parking brake and emergency brake actuation mechanism. Alternatively, the structure of the brake shoe 100 can be other than illustrated if so desired. For example, in certain vehicle brake applications, the brake shoe 100 could be formed without a necked down end 122 but rather could be formed with a uniform or constant shoe width between the opposed ends thereof.

Similarly, the brake shoe 100' includes a first end 120' and an opposite second end 122'. The web portion 102' of the first end 120' of the brake shoe 100' includes a notch 124' formed therein. The notch 124' is adapted to receive an end portion of a part of the pad wear adjuster 54' in a conventional manner. The web portion 102' of the second end 122' of the brake shoe 100' includes a notch 126' formed therein. The notch 126' is adapted to receive a part of the parking brake and emergency brake actuation mechanism.

In accordance with the present invention, the second end 122 of the brake shoe 100 defines a generally T-shaped shoe abutment, indicated generally at 130. The T-shaped shoe abutment 130 is defined by an end surface 132 of the rim portion 104 and an end surface 134 of the web portion 102 of the brake shoe 100.

Figure 8:
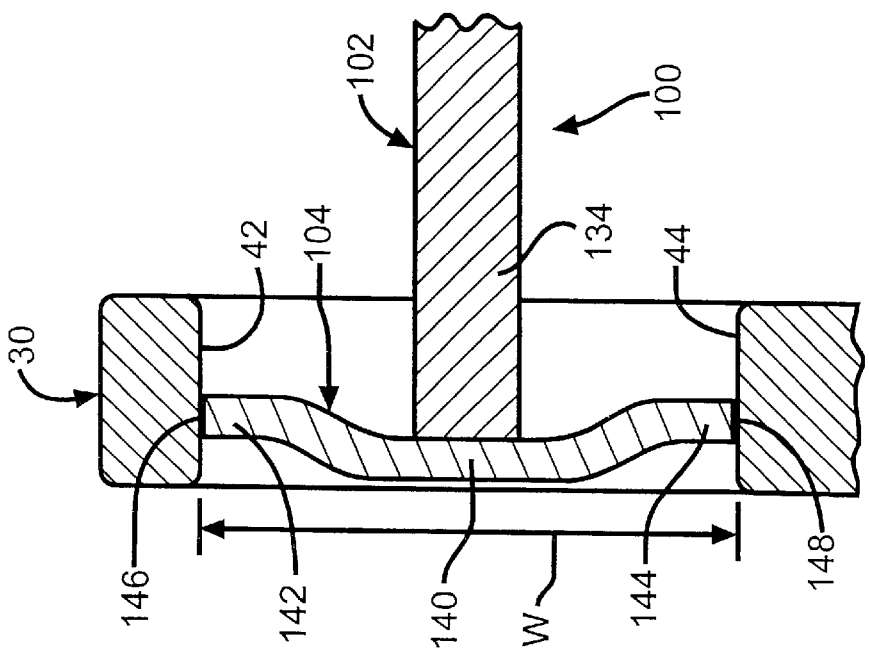
FIG. 8 is a sectional view taken along line 8—8 of FIG. 7.

As best shown in FIG. 8, the end surface 132 of the rim portion 104 includes a center portion 140 and a pair of opposed end portions or wings 142 and 144. In the illustrated embodiment, the end portions 142 and 144 of offset relative to the center portion 140. The end portion 142 includes an endmost side surface 146 and the end portion 144 includes an endmost side surface 148. The center portion 140 includes an endmost surface 150 (shown in phantom in FIG. 7). As shown in FIG. 7, the main body of the rim portion 104 defines a width W2 and the end surface 132 of the rim portion 104 defines a width W1 which is less than the width W2. Also, the width W1 is generally equal to or slightly less than the width W of the slot 40 of the abutment 30. Alternatively, the structure of the second end 122 of the brake shoe 100 can be other than illustrated if so desired. For example, one or both of the end portions 142 and 144 of the end surface 132 could not be offset relative to the center portion 140.

As best shown in FIG. 8, the endmost side surface 146 of the web portion 102 is disposed adjacent and in contact with the side surface 42 of the abutment 30, and the endmost side surface 148 of the web portion 102 is disposed adjacent and in contact with the side surface 44 of the abutment 30. Thus, it can be seen that the endmost side surfaces 146 and 148 of the rim portion 104 of the brake shoe 100 define and function as "upper" or third pairs of opposed gimps provided on the rim portion 104 of the brake shoe 100. However, in some instances, depending upon the uniformity of the web portion 102 of the brake shoe 100 and/or the slot 40 of the abutment 30, the contact between the associated surfaces thereof can be other than illustrated. Also, the end surface 150 of the web portion 102 is disposed adjacent and in contact with the bottom surface 46 of the abutment 30. In the illustrated embodiment, the structure of the end 122' of the brake shoe 100' is the same as that of the end 122 of the brake shoe 100.

One advantage of the present invention is that the T-shaped second ends 122 and 122' of the shoe rim portions 102 and 102', respectively, define the upper shoe gimp. As a result, there is provided an increased friction lining bonding area on the associated shoe rim portion at the upper end portion of the brake shoes. Also, the T-shaped ends 122 and 122' of the rim portions 102 and 102', respectively, allow for the elimination of the shoe web heat treatment hardening process and allows the shoe webs to be made from a more "welding friendly" material (i.e., a material having a reduced carbon content), such as for example, SAE 080 XLF material. As a result, the weldability of the shoe is improved compared to the weldability of similar sized shoes having shoe webs made from a higher carbon content material, such as for example, SAE 1035 modified material. In addition, the associated surfaces 46 of the respective slots 40 are parallel to one another. As a result of this, the machining of the shoe slots 40 is made easier.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle brake assembly comprising:
a brake mounting member adapted to be secured to a fixed, non-rotatable component of the vehicle, said brake mounting member including an abutment having a pair of opposed slots formed therein, each of said slots including a pair of opposed side surfaces and an end surface; and
a pair of brake shoes slidably supported relative to said brake mounting member, each of said brake shoes including a first end, an opposite second end, a web portion, a rim portion secured to an outer surface of said web portion, a friction pad secured to an outer surface of said rim portion, and only two shoe slides provided on at least one side of said rim portion, one of said two shoe slides provided near said first end of said brake shoe and the other of said two shoe slides provided generally intermediate said first and second ends of said brake shoe;

wherein said rim portion near said second end of said brake shoe defines a shoe rim abutment end, said shoe rim abutment end disposed in said slot of said abutment and in contact with at least one of said opposed side surfaces and said end surface of said slot of said abutment to thereby define a third shoe slide of said brake shoe.

2. The vehicle brake assembly according to claim 1 wherein said shoe rim abutment end is generally T-shaped.

3. The vehicle brake assembly according to claim 2 wherein said shoe rim abutment end includes a center portion and a pair of opposed end portions.

4. The vehicle brake assembly according to claim 3 wherein said end portions are offset relative to said center portion.

5. The vehicle brake assembly according to claim 1 wherein said first end of said brake shoe defines a first shoe width and said shoe rim abutment end of said brake shoe defines a second shoe width which is less than said first shoe width.

6. The vehicle brake assembly according to claim 1 wherein said two shoe slides are generally V-shaped.

7. The vehicle brake assembly according to claim 1 wherein said side surfaces extend generally parallel to one another and said end surface extends generally perpendicular to said side surfaces.

8. The vehicle brake assembly according to claim 1 wherein said vehicle brake assembly is a drum-in-hat type of disc brake assembly, said brake mounting member is a drum-in-hat adapter, said abutment is integrally cast with said drum-in-hat adapter, and said brake shoes are supported by a backing plate which is secured to said drum-in-hat adapter.

9. The vehicle brake assembly according to claim 1 wherein said shoe rim abutment end is in contact with at least one of said opposed side surfaces of said slot.

10. The vehicle brake assembly according to claim 1 wherein said shoe rim abutment end is in contact with both of said opposed side surfaces of said slot.

11. A vehicle drum-in-hat disc brake assembly having a disc service brake and a drum-in-hat parking and emergency brake, the drum-in-hat disc brake assembly comprising:

a drum-in-hat adapter adapted to be secured to a fixed, non-rotatable component of the vehicle, said adapter including an abutment having a pair of opposed slots formed therein, each of said slots including a pair of opposed side surfaces and an end surface, said adapter adapted to support the disc service brake portion of the drum-in-hat disc brake assembly; and a backing plate secured to said adapter and adapted to support a drum brake shoe assembly of the drum-in-hat parking and emergency brake portion of the drum-in-hat disc brake assembly, said drum brake shoe assembly including a pair of brake shoes, each of said brake shoes including a first end, an opposite second end, a web portion, a rim portion secured to an outer surface of said web portion, a friction pad secured to an outer surface of said rim portion, and only two shoe slides provided on at least one side of said rim portion, one of said two shoe slides provided near said first end of said brake shoe and the other of said two shoe slides provided generally intermediate said first and second ends of said brake shoe;

wherein said rim portion near said second end of said brake shoe defines a shoe rim abutment end, said shoe rim abutment end disposed in said slot of said abutment and in contact with at least one of said opposed side surfaces and said end surface of said slot of said abutment to thereby define a third shoe slide of said brake shoe.

12. The vehicle drum-in-hat disc brake assembly according to claim 11 wherein said shoe rim abutment end is generally T-shaped.

13. The vehicle drum-in-hat disc brake assembly according to claim 12 wherein said shoe rim abutment end includes a center portion and a pair of opposed end portions.

14. The vehicle drum-in-hat disc brake assembly according to claim 13 wherein said end portions are offset relative to said center portion.

15. The vehicle drum-in-hat disc brake assembly according to claim 11 wherein said first end of said brake shoe defines a first shoe width and said shoe rim abutment end of said brake shoe defines a second shoe width which is less than said first shoe width.

16. The vehicle drum-in-hat disc brake assembly according to claim 11 wherein said two shoe slides are generally V-shaped.

17. The vehicle drum-in-hat disc brake assembly according to claim 11 wherein said side surfaces extend generally parallel to one another and said end surface extends generally perpendicular to said side surfaces.

18. The vehicle drum-in-hat disc brake assembly according to claim 11 wherein said abutment is integrally cast with said drum-in-hat adapter.

19. The vehicle brake assembly according to claim 11 wherein said shoe rim abutment end is in contact with at least one of said opposed side surfaces of said slot.

20. The vehicle brake assembly according to claim 11 wherein said shoe rim abutment end is in contact with both of said opposed side surfaces of said slot.

21. A vehicle drum-in-hat disc brake assembly having a disc service brake and a drum-in-hat parking and emergency brake, the drum-in-hat disc brake assembly comprising:

a drum-in-hat adapter adapted to be secured to a fixed, non-rotatable component of the vehicle, said adapter including an integrally cast abutment having a pair of opposed slots formed therein, each of said slots including a pair of opposed side surfaces and an end surface, said adapter adapted to support the disc service brake portion of the drum-in-hat disc brake assembly; and a backing plate secured to said adapter and adapted to support a drum brake shoe assembly of the drum-in-hat parking and emergency brake portion of the drum-in-hat disc brake assembly, said drum brake shoe assembly including a pair of brake shoes, each of said brake shoes including a first end, an opposite second end, a web portion, a rim portion secured to an outer surface of said web portion, a friction pad secured to an outer surface of said rim portion, and only two shoe slides provided on at least one side of said rim portion, one of said two shoe slides provided near said first end of said brake shoe and the other of said two shoe slides provided generally intermediate said first and second ends of said brake shoe;

wherein said rim portion near said second end of said brake shoe defines a generally T-shaped shoe rim abutment end, said shoe rim abutment end disposed in said slot of said abutment and in contact with at least one of said opposed side surfaces and said end surface of said slot of said abutment to thereby define a third shoe slide of said brake shoe.

22. The vehicle drum-in-hat disc brake assembly according to claim 21 wherein said shoe rim abutment end includes a center portion and a pair of opposed end portions.

23. The vehicle drum-in-hat disc brake assembly according to claim 22 wherein said end portions are offset relative to said center portion.

24. The vehicle drum-in-hat disc brake assembly according to claim 21 wherein said first end of said brake shoe defines a first shoe width and said shoe rim abutment end of said brake shoe defines a second shoe width which is less than said first shoe width.

25. The vehicle brake assembly according to claim 21 wherein said shoe rim abutment end is in contact with at least one of said opposed side surfaces of said slot.

26. The vehicle brake assembly according to claim 21 wherein said shoe rim abutment end is in contact with both of said opposed side surfaces of said slot.

* * * * *